United States Patent
Dodge et al.

(10) Patent No.: US 6,795,778 B2
(45) Date of Patent: Sep. 21, 2004

(54) SYSTEM AND METHOD FOR FACILITATING WELDING SYSTEM DIAGNOSTICS

(75) Inventors: Robert Dodge, Concord, OH (US); Edward Dennis Hillen, Painesville, OH (US); George Daryl Blankenship, Chardon, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 118 days.

(21) Appl. No.: 09/864,741

(22) Filed: May 24, 2001

(65) Prior Publication Data

US 2002/0198667 A1 Dec. 26, 2002

(51) Int. Cl.$^7$ ............................. G01B 3/44; G01B 3/52; G06F 19/00
(52) U.S. Cl. ........................ 702/34; 702/182; 707/10; 228/103; 219/110; 307/64
(58) Field of Search ..................... 702/34, 182; 707/10; 228/103; 219/110; 307/64

(56) References Cited

U.S. PATENT DOCUMENTS

| | | | | |
|---|---|---|---|---|
| 4,419,560 A | * | 12/1983 | Zurek | 219/110 |
| 4,721,947 A | * | 1/1988 | Brown | 228/103 |
| 5,302,799 A | * | 4/1994 | Kennedy et al. | 228/103 |
| 5,602,462 A | * | 2/1997 | Stich et al. | 307/64 |
| 5,772,814 A | * | 6/1998 | Grewell | 307/64 |
| 5,920,856 A | * | 7/1999 | Syeda-Mahmood | 707/10 |
| 5,923,555 A | * | 7/1999 | Bailey et al. | 219/110 |
| 6,041,287 A | * | 3/2000 | Dister et al. | 702/182 |
| 6,233,570 B1 | | 5/2001 | Horvitz et al. | |
| 6,236,017 B1 | * | 5/2001 | Smartt et al. | 219/130.01 |
| 2002/0088786 A1 | * | 7/2002 | Rouault | 707/10 |
| 2002/0168937 A1 | * | 11/2002 | Clark et al. | 702/182 |

OTHER PUBLICATIONS

International Search Report dated Sep. 5, 2002 in PCT patent application No. PCT/US02/14388 filed May 8, 2002.

* cited by examiner

*Primary Examiner*—John Barlow
*Assistant Examiner*—Aditya Bhat
(74) *Attorney, Agent, or Firm*—Amin & Turocy, LLP

(57) ABSTRACT

A system and method for facilitating welding system diagnostics is provided. The invention includes a welder, a local system, a remote system, and/or an alarm component. The invention further provides for receiving sensor input(s), performing test sequence(s) based, at least in part, upon the sensor input(s) and/or performing internal diagnostics. The invention further provides for determining a health status of the welder and communicating the health status of the welder to the local system, the remote system and/or the alarm component. The health status of the welder can include welder alarm(s) and/or fault(s). Information regarding the health status of the welder can be sent by telephone, voicemail, e-mail and/or beeper. The welder can communicate with the local system and/or remote system to schedule maintenance. The invention further provides for a expert component to facilitate welding diagnostics based, at least in part, upon the health status of the welder, welder data, an expert data store, a local service support data store, a remote expert data store and/or a remote service support data store. The expert component can employ various artificial intelligence technique(s) (e.g., Bayesian model, probability tree network, fuzzy logic and/or neural network) to facilitate welding diagnostics based, at least in part, upon the health status received from the welder. The expert component can adaptively modify its modeling technique(s) based upon historical success (e.g., learn from success of previous welding diagnostics). The invention further provides for the welder, local system and/or remote system to initiate corrective action, at least temporarily, based, at least in part, upon the health status of the welder.

31 Claims, 9 Drawing Sheets

| Type | Code | Description | Corrective Action |
|---|---|---|---|
| Fault | 31 | Primary over current. | Cycle power. |
| Fault | 32 | CAP bank A under voltage. | Self-clearing as condition ceases. |
| Fault | 33 | CAP bank B under voltage. | Self-clearing as condition ceases. |
| Fault | 34 | CAP bank A over voltage. | Self-clearing as condition ceases. |
| Fault | 35 | CAP bank B over voltage. | Self-clearing as condition ceases. |
| Fault | 36 | Thermostat. | Self-clearing as condition ceases. |
| Fault | 37 | Soft start Failed. | Cycle power. |
| Fault | 39 | Glitch on the primary over current fault interrupt; possibly caused by noise or a signal level right at the trip threshold. (misc. hardware fault #1) | Self-clearing as condition ceases. |
| Fault | 42 | Power down. This is fault is not presently used. | Causes system reset or power down. |
| Fault | 43 | CAP delta; CAP A and B are out of balance. | Self-clearing as condition ceases. |
| Fault | 44 | Main CPU problem. The DSP has detected a problem with the CPU. | Self-clearing as condition ceases. |
| Fault | 47 | Glitch on the CAP/heart beat interrupt; possibly caused by noise or a signal level right at the trip threshold. (misc. hardware fault #2) | Self-clearing as condition ceases. |
| Fault | 48 | The main contactor opened unexpectedly. (misc. hardware fault #3) | Self-clearing. |
| Alarm | 41 | Secondary current has exceeded the long-term current threshold. | Maximum current level is reduced to 100 amps until the actual level is reduced to 50 amps at which time the normal limit is reapplied. |
| Alarm | 46 | Secondary current has exceeded the short-term current threshold. | Maximum current level is reduced to 100 amps until the actual level is reduced to 50 amps at which time the normal limit is reapplied. |
| Alarm | 49 | A phase was lost. | The maximum output level is reduced until the phase returns. |
| Fault | 81 | Wire drive motor overload | Maximum average current threshold has been exceeded by the wire drive motor. |

Fig. 3

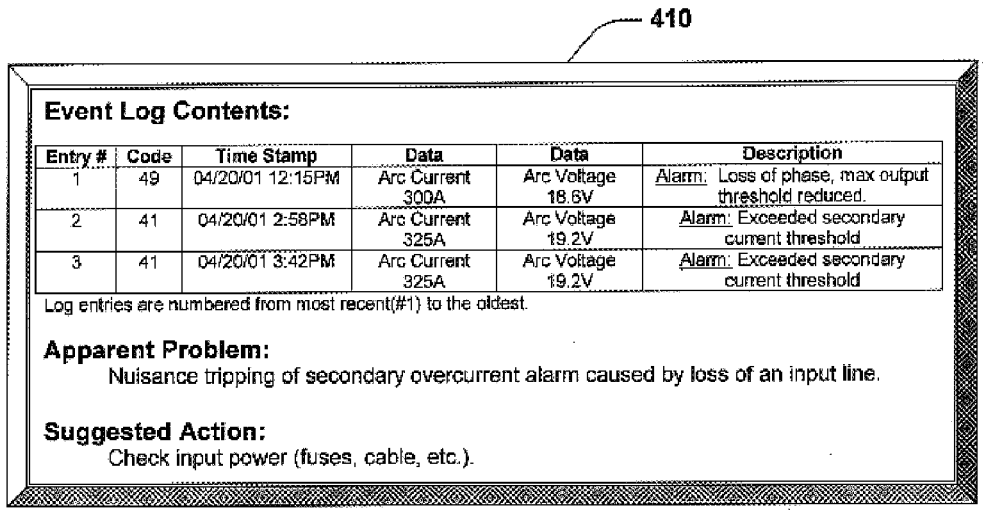
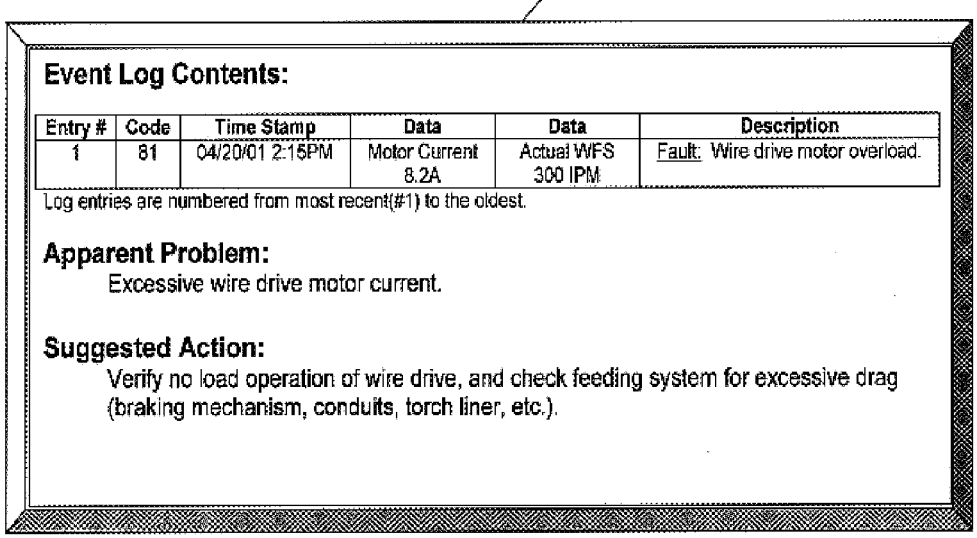
Fig. 4

SYSTEM AND METHOD FOR FACILITATING WELDING SYSTEM DIAGNOSTICS

TECHNICAL FIELD

The present invention relates generally to computer and welding systems. More particularly, the present invention relates to a system and method for facilitating welding system diagnostics.

BACKGROUND

Welding systems reside at the core of the modern industrial age. From massive automobile assembly operations to automated manufacturing environments, these systems facilitate joining in ever more complicated manufacturing operations. One such example of a welding system includes an electric arc welding system. This may involve movement of a consumable electrode, for example, toward a work piece while current is passed through the electrode and across an arc developed between the electrode and the work piece. The electrode may be a non-consumable or consumable type, wherein portions of the electrode may be melted and deposited on the work piece. Often, hundreds or perhaps thousands of welders are employed to drive multiple aspects of an assembly process, wherein sophisticated controllers enable individual welders to operate within relevant portions of the process. For example, some of these aspects relate to control of power and waveforms supplied to the electrode, movements or travel of a welding tip during welding, electrode travel to other welding points, gas control to protect a molten weld pool from oxidation at elevated temperatures and provide ionized plasma for an arc, and other aspects such as arc stability to control the quality of the weld. These systems are often deployed over great distances in larger manufacturing environments and many times are spread across multiple manufacturing centers. Given the nature and requirements of modern and more complex manufacturing operations however, welding systems designers, architects and suppliers face increasing challenges in regard to upgrading, maintaining, controlling, servicing and supplying various welding locations. Unfortunately, many conventional welding systems operate in individually controlled and somewhat isolated manufacturing locations in regard to the overall assembly process. Thus, controlling, maintaining, servicing and supplying multiple and isolated locations in large centers, and/or across the globe, has become more challenging, time consuming and expensive.

One such challenge relates to facilitating service support of welder(s) and/or welding system(s). Conventionally, service support of welder(s) has occurred via an awkward combination of technical manuals and/or bulletins from manufacturers and/or diagnosis of welder(s) by operator(s). As welder(s) become increasing complex they have likewise become increasing difficult to service and/or support leading to increase down time.

Further, welder fault(s) and/or alarm(s) have been difficult for operator(s) to monitor and/or initiate corrective action. Conventionally, operator(s) learn of fault(s) and/or alarm(s) when they are in physical proximity of the welder (e.g., by reviewing status indicator(s) and/or monitoring equipment). This can be time-consuming and can lead to inconsistent result based upon an operator's level of experience.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention relates to a system and method for facilitating welding diagnostics. The present invention provides for a welder to be operatively connected to a local system, a remote system and/or an alarm component. A sensor component of the welder can receive information regarding operation of the welder and/or weld characteristics through test equipment and/or monitoring equipment. A control component of the welder can execute test sequence(s) based, at least in part, upon information received from the sensor component to facilitate welding system diagnostics. Information from the sensor component and/or the control component can be received by a diagnostic component that can perform internal diagnostics. Based, at least in part, upon information received from the sensor component, control component and/or internal diagnostics, the diagnostics component can determine a health status of the welder and/or whether the welder has any functional and/or performance problems (e.g., alarm(s) and/or fault(s)). The welder can communicate the health status of the welder, welder data and/or whether the welder has functional and/or performance problems to the local system, the remote system and/or the alarm component (e.g., via voicemail, telephone, e-mail and/or beeper). Information regarding the health status of the welder, functional and/or performance problems can further be stored in an event log.

Accordingly to another aspect of the present invention, the remote system can have an expert component for facilitating welding diagnostics. The expert component can employ various artificial intelligence technique(s) (e.g., Bayesian model, probability tree network, fuzzy logic and/or neural network) to facilitate welding diagnostics based, at least in part, upon the welder data and/or health status received from the welder. The expert component can adaptively modify its modeling technique(s) based upon historical success (e.g., learn from success of previous welding diagnostics).

Yet another aspect of the present invention provides for the expert component to access an expert data store, a local service support data store, a remote expert data store and/or a remote service support data store to facilitate welding diagnostics. The expert data store and/or the remote expert data store can store information associated with welding diagnostics (e.g., current expert system rules, diagrams, welder troubleshooting procedure(s) and/or welder software upgrade(s)) that the expert component can utilize to facilitate welding diagnostics. The local service support data store and/or the remote service support data store can store information (e.g., welder service record, welder part order information, welder warranty information and/or welder service information) that the expert component can utilize to facilitate welding diagnostics.

According to an aspect of the present invention, the welder, local system and/or remote system can initiate corrective action, at least temporarily, based, at least in part, upon the health status of the welder. Further, the welder can communicate with the local system and/or the remote system (e.g., via voicemail, telephone, e-mail and/or beeper) to schedule maintenance (e.g., based upon usage of the welder).

The following description and the annexed drawings set forth in detail certain illustrative aspects of the invention.

These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 3 is a table of simulated errors and/or alarms generated in accordance with an aspect of the present invention.

FIG. 4 is a simulated screen shot of a user interface in accordance with an aspect of the present invention.

DESCRIPTION OF THE INVENTION

Figure 1:
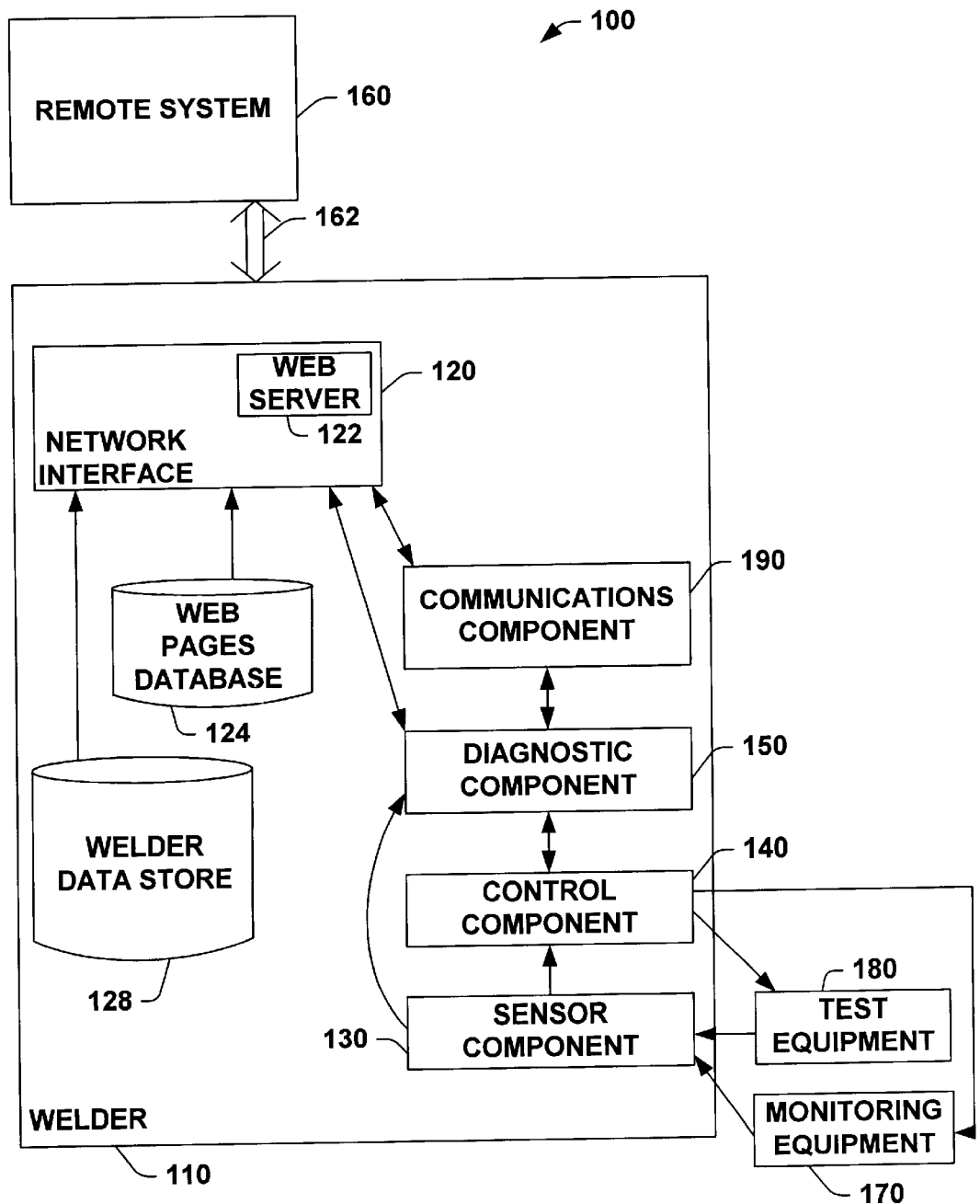
FIG. 1 is a block diagram of a welding diagnostics system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident to one skilled in the art that the present invention may be practiced without these specific details. In other instances, well-known structures and devices are shown in block diagram form in order to facilitate description of the present invention.

As used in this application, "system" is a structure comprising one or more components. A "component" is a structure comprising computer hardware and/or software. For example, a component can be, but is not limited to, a computer readable memory encoded with software instructions or a computer configured to carry out specified tasks. By way of illustration, both an application program stored in computer readable memory and a server on which the application runs can be components. Due to the nature of components, multiple components can be intermingled and are often not separate from one another. Systems can likewise be intermingled and inseparable. Further, "extranet" refers to a network of trusted trading partners communicating securely via a network that can be, but is not limited to, the Internet, a local area network, a computer network, an Intranet, a wide area network, a virtual private network, a metropolitan area network, and a wireless network.

A "welder" refers to physical hardware for producing a weld such as a wire feeder, contact tip, dresser, gas mixer, gas sneezer, gas controller, clamp actuator, travel carriage/ part manipulator, robot arm/beam/torch manipulator, laser seam tracker, other input/output devices and welding power source along with any controller(s), monitor(s) and communications interface(s) associated with the physical hardware. For example, a welder can be used to perform gas metal arc welding (MIG), flux cored arc welding, metal cored arc welding, submerged arc welding (SAW), narrow groove welding, hot wire filled gas tungsten arc (TIG) welding, cold wire filled TIG welding, plasma arc welding, electron beam and laser welding, hardface welding, arc gauging and manual shielded arc welding (stick welding).

Referring to FIG. 1, a welding diagnostics system 100 in accordance with an aspect of the present invention is illustrated. The welding diagnostics system 100 includes a welder 110 having a network interface 120, a sensor component 130, a control component 140 and a diagnostic component 150.

The network interface 120 can operatively couple the welder 110 to a remote system 160 via a network 162. For example, the network 162 can employ Ethernet (IEEE 802.3), Wireless Ethernet (IEEE 802.11), PPP (point-to-point protocol), point-to-multipoint short-range RF (Radio Frequency), WAP (Wireless Application Protocol), Bluetooth, IP, IPv6, TCP and User Datagram Protocol (UDP). Further, the network connection can be via an extranet. For example, the network connection can be via a phone connection (not shown) from the network interface 120 to an Internet Service Provider (ISP) to the remote system 160. Another possible network connection is via a Local Area Network (LAN) to the remote system 160. It is noted that the welder 110 and associated welding equipment (not shown) can communicate over a separate and isolated network from the network 162 (e.g., Arclink). Information exchanged between and among the welder 110 and the remote system 160 can be in a variety of formats and can include, but is not limited to, such technologies as HTML, SHTML, VB Script, JAVA, CGI Script, JAVA Script, dynamic HTML, PPP, RPC, TELNET, TCP/IP, FTP, ASP, XML, PDF, EDI, WML as well as other formats.

The sensor component 130 is adapted to receive information associated with operation of the welder 110 (e.g., voltage and/or current levels) and/or characteristic(s) of weld(s) produced by the welder 110 (e.g., image of weld(s)). The sensor component 130 can receive information from monitoring equipment 170 (e.g., digital camera and/or streaming video camera image(s) of weld(s)) and/or test equipment 180 (e.g., ohm meter, voltage meter and/or current meter).

The control component 140 is adapted to receive information from the sensor component 130 and can perform test sequence(s) to facilitate diagnostics of the welder 110 based, at least in part, upon information received from the sensor component 130.

The diagnostics component 150 is adapted to receive information from the sensor component 130 and/or the control component 140. Further, the diagnostic component 150 can receive diagnostic information associated with component(s) and/or system(s) internal to the welder 110 (e.g., printed circuit board(s)). The diagnostic component 150 can perform resident diagnostic modes with regard to the component(s) and/or system(s) internal to the welder 110. The diagnostic component 150 can initiate test sequence(s) to facilitate diagnostics of the welder 110 based at least in part upon information received from the sensor component 130, the control component 150 and/or internal diagnostics.

Based, at least in part, upon information received from the sensor component 130, the control component 140 and/or internal diagnostics, the diagnostic component can determine a health status of the welder 110. The health status of the welder can include, but is not limited to, information associated with functional and/or performance test results of the welder, error(s) and/or alarm(s). The diagnostic component 150 can send information associated with the health status of the welder 110 to the remote system 160 via the network interface 120. Further, the diagnostic component 150 can initiate corrective action based, at least in part, upon information received from the sensor component 130, the control component 140 and/or internal diagnostics. For example, if the diagnostic component 150 determines that secondary current of the welder 110 has exceeded a threshold for current (e.g., 150 amps), the diagnostic component 150 can, at least temporarily, initiate a reduction in welder current (e.g., 50 amps) until the diagnostic component 150 determines that the condition has been corrected and/or the diagnostic component 150 has been overridden (e.g., by operator instruction).

The welder 110 can further include a communications component 190 facilitating communication between the welder 110 and the remote system 160. The communications component 190 can receive information associated with the health status of the welder (e.g., an alarm condition) and format the information for use by the remote system 160 (e.g., HTML document). The communications component 190 can dynamically provide information regarding the health status of the welder to the remote system in a plurality of format(s) within the scope of the present invention (e.g., via dynamic HTML, RTF and/or ASCII text). For example, based upon the health status of the welder, the communications component 190 can dynamically create an HTML file for transmission to the remote system 160 (e.g., using CGI scripts, Java or JavaScript). Further, the welder 110 can communicate with the remote system 160 (e.g., via voicemail, telephone, e-mail and/or beeper) to schedule maintenance (e.g., based upon usage of the welder).

The network interface 120 can include a web server 122 that provides information exchange with the remote system 160. The welder 110 can further include a web pages database 124 and a welder data store 128. The web pages database 124 can store information associated with welding diagnostics stored on the remote system 160 accessible via the network interface 120. For example, the web pages database 124 can provide hyperlinks to welding diagnostic resource(s) available via the Internet to an operator of the welder 110 (e.g., accessible via the web server 122). Further, information regarding the health status of the welder can be exchanged via web pages and/or information stored in the web pages database 124.

The welder data store 128 can store information associated with the welder 110 (e.g., welder serial number, welder model number, welder build date and/or welder software version identifier) and/or information associated with component part(s) of the welder 110 (e.g., component part identifier(s), component version identifier(s) and/or component software version identifier(s)). Information associated with the welder 110 stored in the welder data store 128 can be transmitted via the network interface 120 to the remote system 160. For example, the remote system 160 can query the welder data store 128 for information associated with a component printed circuit board to determine a software version number to facilitate the remote system 160 in determining likely cause(s) of welder fault(s) and/or alarm(s).

Figure 2:
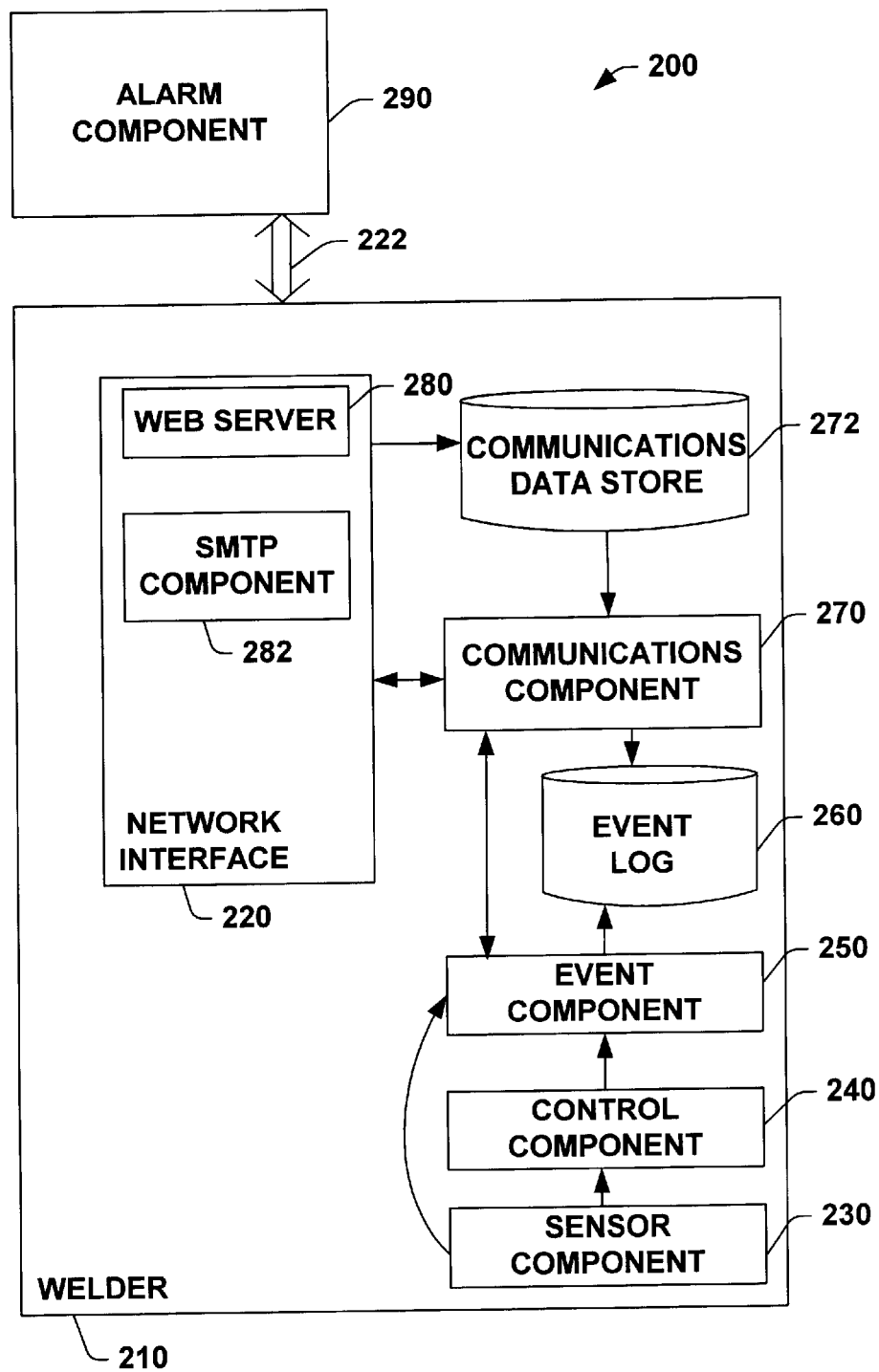
FIG. 2 is a block diagram of a welding diagnostics system in accordance with an aspect of the present invention.

Turning to FIG. 2, a welding diagnostics system 200 in accordance with an aspect of the present invention is illustrated. The welding diagnostics system 200 includes a welder 210 having a network interface 220, a sensor component 230, a control component 240, an event component 250 and an event log 260. The welder can further have a communications component 270.

The network interface 220 can operatively couple the welder 210 to an alarm component 290 via a network 222. For example, the network 222 can employ Ethernet (IEEE 802.3), Wireless Ethernet (IEEE 802.11), PPP (point-to-point protocol), point-to-multipoint short-range RF (Radio Frequency), WAP (Wireless Application Protocol), Bluetooth, IP, IPv6, TCP and User Datagram Protocol (UDP). Further, the network connection can be via an extranet. For example, the network connection can be via a phone connection (not shown) from the network interface 220 to an Internet Service Provider (ISP) to the alarm component 290. Another possible network connection is via a Local Area Network (LAN) to the alarm component 290. It is noted that the welder 210 and associated welding equipment (not shown) can communicate over a separate and isolated network from the network 222 (e.g., Arclink). Information exchanged between and among the welder 210 and the alarm component 290 can be in a variety of formats and can include, but is not limited to, such technologies as HTML, SHTML, VB Script, JAVA, CGI Script, JAVA Script, dynamic HTML, PPP, RPC, TELNET, TCP/IP, FTP, ASP, XML, PDF, EDI, WML as well as other formats.

The sensor component 230 is adapted to receive information associated with operation of the welder 210 (e.g., voltage and/or current levels) and/or characteristic(s) of weld(s) produced by the welder 210 (e.g., image of weld). The sensor component 230 can receive information from monitoring equipment (not shown) (e.g., digital camera and/or streaming video camera image(s) of weld(s)) and/or test equipment (not shown) (e.g., ohm meter, voltage meter and/or current meter).

The control component 240 is adapted to receive information from the sensor component 230 and/or the control component and to perform test sequence(s) to facilitate diagnostics of the welder 210 based at least in part upon information received from the sensor component 230. For example, upon receiving an unexpected indication of low resistance (e.g., possibly indicative of a short circuit), the control component 240 can execute test sequence(s) to assist in determining a cause of the indication (e.g., external problem such as a shorted connection and/or internal problem such as a failed welder component). The control component 240 can further receive diagnostic information associated with component(s) and/or system(s) internal to the welder 210 (e.g., printed circuit board(s)). The control component 240 can perform resident diagnostic modes with regard to the component(s) and/or system(s) internal to the welder 210. The control component 240 can perform test sequence(s) to facilitate diagnostics of the welder 210 based at least in part upon information received from the sensor component 230 and/or internal diagnostics.

The event component 250 is adapted to receive information from the sensor component 230 and/or the control component 240. Based, at least in part, upon information received from the sensor component 230, the control component 240 and/or internal diagnostics, the event component 250 determines the occurrence of welder event(s) (e.g., fault and/or alarm condition). The event component 250 can store information associated with welder event(s) in an event log 260 (e.g., fault and/or alarm, code number, description of event, suggested corrective action and/or time-stamp of event(s). The event component 250 can send information associated with welder event(s) to the network interface 220 for communication to an alarm component 290 (e.g., fault and/or alarm, code number, description of event, apparent problem, suggested corrective action and/or time-stamp of event).

Information associated with welder event(s) stored in the event log 260 can be available for review by an operator (e.g., via a video display terminal) and/or remote system (not shown). Information stored in the event log 260 can be stored in a variety of data structures including, but not limited to, lists, arrays and/or databases. Referring to FIG. 3, a table of simulated errors and/or alarms generated in accordance with an aspect of the present invention is illustrated.

Turning to FIG. 4, simulated screen shots 410 and 420 of a user interface in accordance with an aspect of the present invention are illustrated. Simulated screen shot 410 graphically depicts information stored in the event log 260. Simulated screen shot 410 has three event entries having an entry number, event code, time stamp, two data fields and a description field. Simulated screen shot 410 further provides an apparent problem and suggested action (e.g., determined by the event component 250, control component 240, diagnostic component 150, remote system 160 and/or alarm component 290).

Simulated screen shot 420 graphically depicts information stored in an event log 260. Simulated screen shot 420 has one entry having an entry number, event code, time stamp, two data fields and a description field. Simulated screen shot 420 also provides an apparent problem and suggested action (e.g., determined by the event component 250, control component 240, diagnostic component 150, remote system 160 and/or alarm component 290).

Simulated screen shots 410 and 420 illustrate information that may be available to a user, remote system and/or alarm component based upon information stored, for example, in the event log 260. It is to be appreciated that additional or less information may be made available to a user, remote system and/or alarm component regarding welder event(s) in accordance with the present invention.

Turning back to FIG. 2, the welder 210 can further include a communications component 270 facilitating communication between the welder 210 and the alarm component 290. The communications component 190 can receive information associated with welder event(s) (e.g., alarm(s), fault(s), functional test result(s) and/or performance test result(s)) and format the information for transmission to the alarm component 290 (e.g., Dynamic HTML, rich-text format or ASCII text). The welder 210 can further include a communications data store 272 storing information regarding how to handle particular fault(s) and/or alarm(s). Based upon information stored in the communications data store 272, the communications component 270 can determine a mode (e.g., voicemail number, e-mail address, telephone number and/or beeper number) for notification that alarm and/or fault event(s) have occurred.

The network interface 220 can further include a SMTP component 282 for transmitting and/or receiving email regarding welder health status. For example, the SMTP component 282 can receive a request from the alarm component 290 (e.g., Internet enabled personal digital assistant) for information stored in the event log 260. Responding to the request, the SMTP component 282 can request information stored in the event log 260 via the communications component 270. It is to be appreciated that the communications component 270 can retrieve particular information requested (e.g., most recent alarm/fault) and/or transmit substantially all information stored in the event log 260. The communications component 270 can format information stored in the event log 260 for transmission by the SMTP component 282 to the alarm component 290. The network interface 220 can further include a web server 280 facilitating information exchange with the alarm component 290 (e.g., computer system, beeper, telephone, personal digital assistant).

Figure 5:
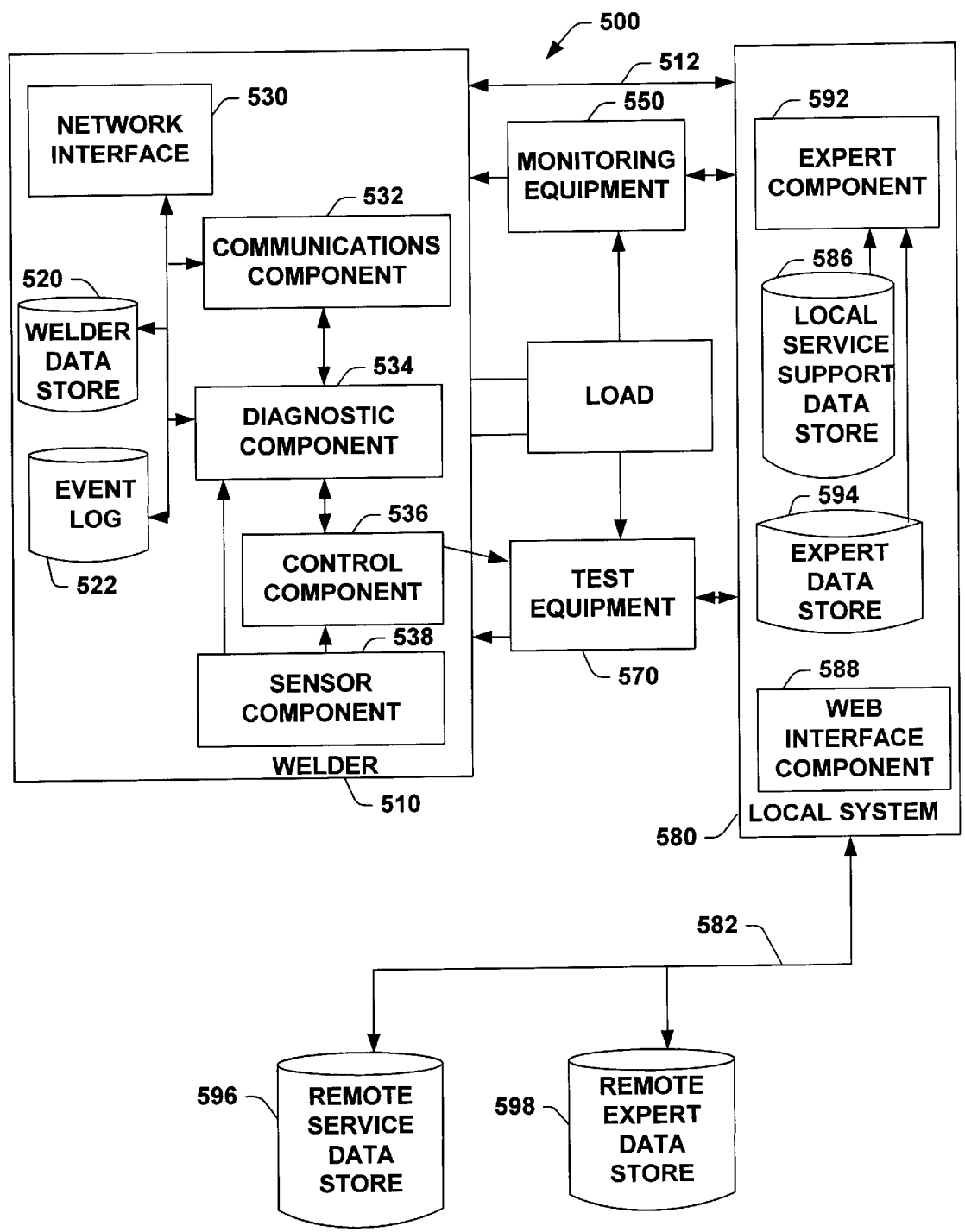
FIG. 5 is a block diagram of a welding diagnostics system in accordance with an aspect of the present invention.

Next, referring to FIG. 5, a welding diagnostics system 500 in accordance with an aspect of the present invention is illustrated. The welding diagnostic system 500 includes a welder 510 having a network interface 530, a sensor component 538, a control component 536, a diagnostic component 534, a communications component 532 and a welder data store 520. The welder 510 can further include an event log 522.

The welder 510 and a local system 580 are operatively coupled via a first network 512. For example, the first network 512 can employ Ethernet (IEEE 802.3), Wireless Ethernet (IEEE 802.11), PPP (point-to-point protocol), point-to-multipoint short-range RF (Radio Frequency), WAP (Wireless Application Protocol), Bluetooth, IP, IPv6, TCP and User Datagram Protocol (UDP). Information exchanged between and among the local system 580 and the welder 510 can be in a variety of formats and can include, but is not limited to, such technologies as HTML, SHTML, VB Script, JAVA, CGI Script, JAVA Script, dynamic HTML, PPP, RPC, TELNET, TCP/IP, FTP, ASP, XML, PDF, EDI, WML as well as other formats.

The sensor component 538 is adapted to receive information associated with operation of the welder 510 (e.g., voltage and/or current levels) and/or weld characteristic(s) of weld(s) produced by the welder 510 (e.g., image(s) of weld(s)). The sensor component 538 and/or the local system 580 can receive information from monitoring equipment 550 (e.g., digital camera and/or streaming video camera image(s) of weld(s)) and/or test equipment 570 (e.g., ohm meter, voltage meter and/or current meter). It is to be appreciated that the monitoring equipment 550 and/or test equipment 570 can be operatively coupled to the welder 510 and/or the local system 580.

The control component 536 is adapted to receive information from the sensor component 538 and to perform test sequence(s) to facilitate diagnostics of the welder 510 based, at least in part, upon information received from the sensor component 538.

The diagnostic component 534 is adapted to receive information from the sensor component 538 and/or the control component 536. The diagnostic component 534 can further receive diagnostic information associated with component(s) and/or system(s) internal to the welder 510 (e.g., printed circuit board(s)). The diagnostic component 534 can perform resident diagnostic mode(s) with regard to the component(s) and/or system(s) internal to the welder 510. Based, at least in part, upon information received from the sensor component 538, the control component 536 and/or internal diagnostics, the diagnostic component 534 determines health status of the welder 510. The health status of the welder can include, but is not limited to, information associated with functional and/or performance test results of the welder, error(s) and/or alarm(s). The diagnostic component 534 can send information associated with the health status of the welder 510 to the local system 580 via the network interface 530. Further, the diagnostic component 534 can initiate corrective action based at least in part upon information received from the sensor component 538 and/or the control component 536.

The welder 510 can further include a communications component 532 facilitating communications between the welder 510 and the local system 580. The communications component 532 can receive information associated with the health status of the welder (e.g., an alarm condition) and format the information for use by the local system 580 (e.g., HTML document). Thus, the communications component 532 can dynamically provide information regarding the health status of the welder to the local system 580 in a plurality of format(s) within the scope of the present invention (e.g., via dynamic HTML, RTF and/or ASCII text). For example, based upon the health status of the welder, the communications component 532 can dynamically create an HTML file for transmission to the local system 580 (e.g., using CGI scripts, Java or JavaScript). Further, the welder 510 can communicate with the local system 580 (e.g., via voicemail, telephone, e-mail and/or beeper) to schedule maintenance (e.g., based upon usage of the welder). Information associated with the health status of the welder 510 (e.g., alarm(s) and/or fault(s)) can be stored in the event log 522.

The welder data store 520 can provide information associated with the welder 510 (e.g., welder serial number, welder model number, welder build date and/or welder software version identifier) and/or information associated with component part(s) of the welder 110 (e.g., component part identifier(s), component version identifier(s) and/or component software version identifier(s)). Information associated with the welder 510 stored in the welder data store 520 can be transmitted via the network interface 530 to the local system 580. For example, the local system 580 can query the welder data store 520 for information associated with a component printed circuit board to determine a software version number in order to determine a likely cause of a welder fault and/or alarm.

The local system 580 can have an expert component 592, an expert data store 594, a local service support data store 586 and a web interface component 588. The expert component 592 can employ various artificial intelligence technique(s) (e.g., Bayesian model, probability tree network, fuzzy logic and/or neural network) to facilitate welding diagnostics based, at least in part, upon the health status received from the welder 510. Further, the expert component 592 can adaptively modify its modeling technique(s) based upon historical success (e.g., learn from success of previous welding diagnostics).

The expert data store 594 can store information associated with welding diagnostics (e.g., current expert system rules, diagrams, welder troubleshooting procedure(s) and/or welder software upgrade(s)) that the expert component 592 can utilize to facilitate welding diagnostics. The local service support data store 586 can store information (e.g., welder service record, welder part order information, welder warranty information and/or welder service information) that the expert component 592 can utilize to facilitate welding diagnostics.

The welding diagnostics system 500 can further include a remote expert data store 598 and/or a remote service data store 596 operatively coupled to the web interface component 588 of the local system 580 via a second network connection 582. For example, the second network 582 can employ Ethernet (IEEE 802.3), Wireless Ethernet (IEEE 802.11), PPP (point-to-point protocol), point-to-multipoint short-range RF (Radio Frequency), WAP (Wireless Application Protocol), Bluetooth, IP, IPv6, TCP and User Datagram Protocol (UDP). Further, the second network connection can be via an extranet. For example, the second network connection can be via a phone connection (not shown) from the local system 580 to an Internet Service Provider (ISP) to the remote welding data store 594 and/or the remote service data store 596. Another possible network connection is via a Local Area Network (LAN) to the remote expert data store 598 and/or the remote service data store 596. Information exchanged between and among the local system 580 and the remote expert data store 598 and/or the remote service data store 596 can be in a variety of formats and can include, but is not limited to, such technologies as HTML, SHTML, VB Script, JAVA, CGI Script, JAVA Script, dynamic HTML, PPP, RPC, TELNET, TCP/IP, FTP, ASP, XML, PDF, EDI, WML as well as other formats. It is to be appreciated that the welder 510 and associated welding equipment (not shown) can communicate over a separate and isolated network (e.g., Arclink) from the first network 512 and/or the second network 582.

The remote expert data store 598 can store information associated with welding diagnostics (e.g., current expert system rules, diagrams, welder troubleshooting procedure(s) and/or welder software upgrade(s)) that the expert component 592 can utilize to facilitate welding diagnostics. The remote service data store 596 can store information (e.g., welder service record, welder part order information, welder warranty information and/or welder service information) that the expert component 592 can utilize to facilitate welding diagnostics.

Figure 6:
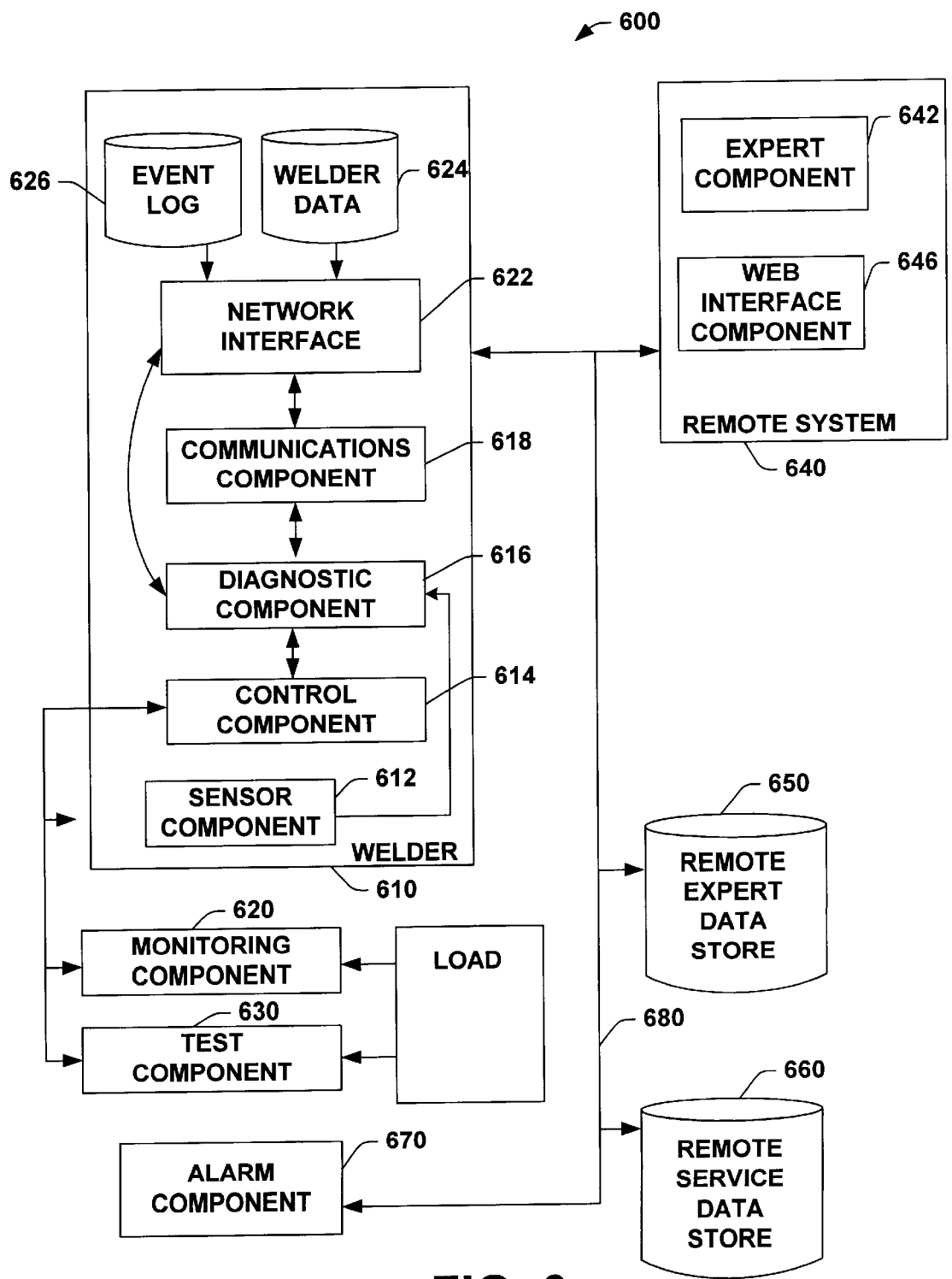
FIG. 6 is a block diagram of a welding diagnostics system in accordance with an aspect of the present invention.

Referring to FIG. 6, a welding diagnostics system 600 in accordance with an aspect of the present invention is illustrated. The welding diagnostic system 600 includes a welder 610 having a network interface 622, a sensor component 612, a control component 614, a diagnostic component 616, a communications component 618 and a welder data store 624. The welder 610 can further include an event log 626.

The welder 610 and a remote system 640 are operatively coupled via a network 680. For example, the network 680 can employ Ethernet (IEEE 802.3), Wireless Ethernet (IEEE 802.11), PPP (point-to-point protocol), point-to-multipoint short-range RF (Radio Frequency), WAP (Wireless Application Protocol), Bluetooth, IP, IPv6, TCP and User Datagram Protocol (UDP). Information exchanged between and among the remote system 640 and the welder 610 can be in a variety of formats and can include, but is not limited to, such technologies as HTML, SHTML, VB Script, JAVA, CGI Script, JAVA Script, dynamic HTML, PPP, RPC, TELNET, TCP/IP, FTP, ASP, XML, PDF, EDI, WML as well as other formats.

The sensor component 612 is adapted to receive information associated with operation of the welder 610 (e.g., voltage and/or current levels) and/or characteristic(s) of weld(s) produced by the welder 610 (e.g., image(s) of weld(s)). The sensor component 612 can receive information from monitoring equipment 620 (e.g., digital camera and/or streaming video camera image(s) of weld(s)) and/or test equipment 630 (e.g., ohm meter, voltage meter and/or current meter).

The control component 614 is adapted to receive information from the sensor component 612 and to perform test sequence(s) to facilitate diagnostics of the welder 610 based, at least in part, upon information received from the sensor component 612.

The diagnostic component 616 is adapted to receive information from the sensor component 612 and/or the control component 614. The diagnostic component 614 can further receive diagnostic information associated with component(s) and/or system(s) internal to the welder 610 (e.g., printed circuit board(s)). The diagnostic component 616 can perform resident diagnostic mode(s) with regard to the component(s) and/or system(s) internal to the welder 610. Based, at least in part, upon information received from the sensor component 612, the control component 614 and/or internal diagnostics, the diagnostic component 616 determines health status of the welder 610. The health status of the welder can include, but is not limited to, information associated with functional and/or performance test results of the welder, error(s) and/or alarm(s). The diagnostic component 616 can send information associated with the health status of the welder 610 to the remote system 640 via the network interface 622. Further, the diagnostic component 616 can initiate corrective action based, at least in part upon information, received from the sensor component 612, the control component 614, internal diagnostics or from the remote system 640. Information associated with the health status of the welder 610 (e.g., alarm(s) and/or fault(s)) can be stored in the event log 626.

The welder 610 can further include a communications component 618 facilitating communications between the welder 610 and the remote system 640. The communications component 618 can receive information associated with the health status of the welder (e.g., an alarm condition) and format the information for use by the remote system 640 (e.g., HTML document). Thus, the communications component 618 can dynamically provide information regarding the health status of the welder to the remote system 640 in a plurality of format(s) within the scope of the present invention (e.g., via dynamic HTML, RTF and/or ASCII text). For example, based upon the health status of the welder, the communications component 618 can dynamically create an HTML file for transmission to the remote system 640 (e.g., using CGI scripts, Java or JavaScript). Further, the welder 610 can communicate with the remote system 640 (e.g., via voicemail, telephone, e-mail and/or beeper) to schedule maintenance (e.g., based upon usage of the welder).

The welder data store 624 can provide information associated with the welder 610 (e.g., welder serial number, welder model number, welder build date and/or welder software version identifier) and/or information associated with component part(s) of the welder 110 (e.g., component part identifier(s), component version identifier(s) and/or component software version identifier). Information associated with the welder 610 stored in the welder data store 624 can be transmitted via the network interface 622 to the remote system 640. For example, the remote system 640 can query the welder data store 624 for information associated with a component printed circuit board to determine a software version number in order to determine a likely cause of a welder fault and/or alarm.

The remote system 640 can have an expert component 642 and a web interface component 644. The expert component 642 can employ various artificial intelligence technique(s) (e.g., Bayesian model, probability tree network, fuzzy logic and/or neural network) to facilitate welding diagnostics based, at least in part, upon the health status received from the welder 610. The expert component 642 can adaptively modify its modeling technique(s) based upon historical success (e.g., learn from success of previous welding diagnostics). The web interface component 644 can operatively connect the remote system 640 to remote welding resource(s) (e.g., via the Internet) and/or the welder 610.

The welding diagnostics system 600 can further include a remote expert data store 650 and/or a remote service support data store 660. The remote expert data store 650 can store information associated with welding diagnostics (e.g., current expert system rules, diagrams, welder troubleshooting procedure(s) and/or welder software upgrade(s)) that the expert component 642 can access via the network 680 to facilitate welding diagnostics. The remote service support data store 660 can store information (e.g., welder service record, welder part order information, welder warranty information and/or welder service information) that the expert component 642 can access via the network 680 to facilitate welding diagnostics.

Figure 7:
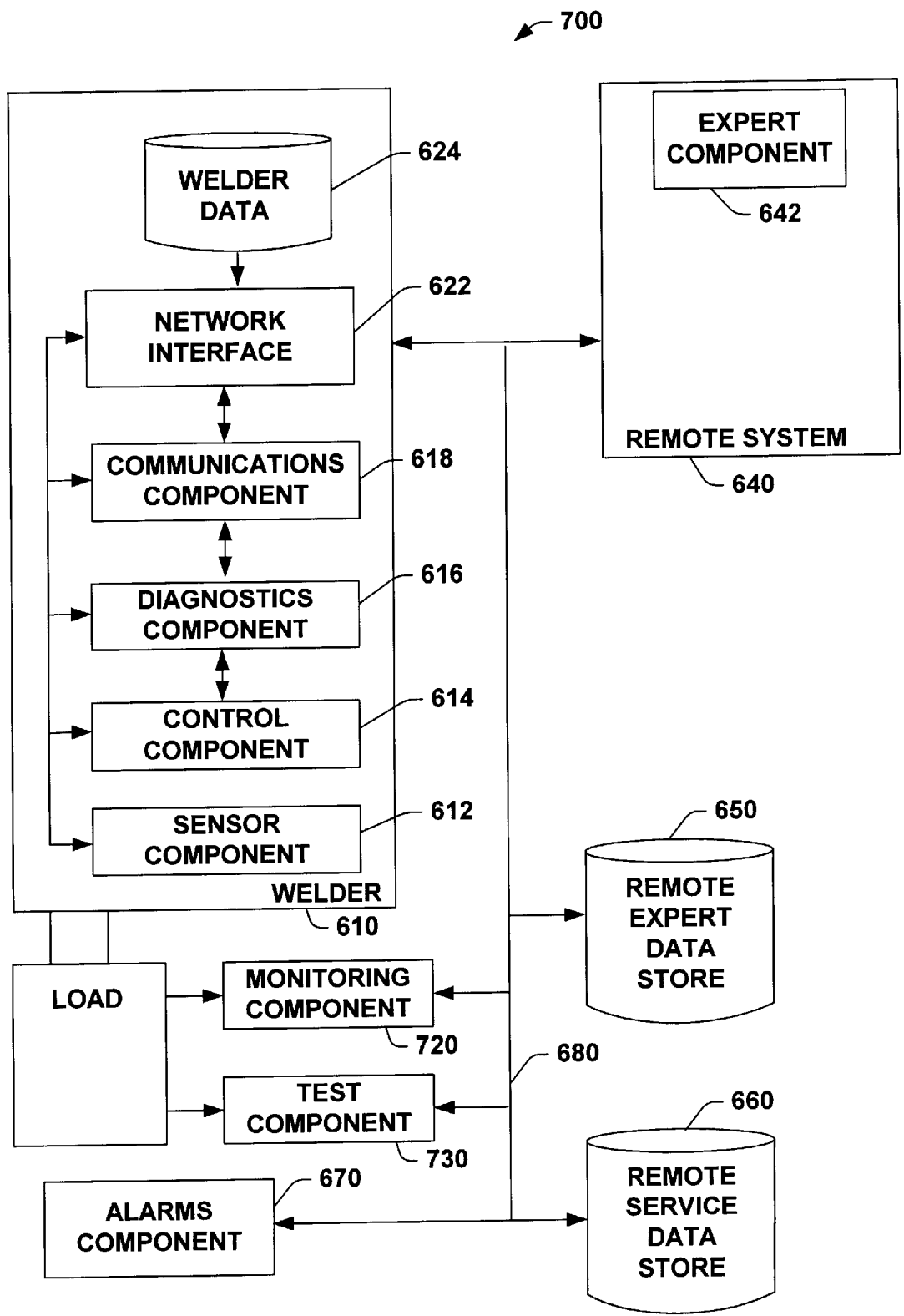
FIG. 7 is a block diagram of a welding diagnostics system in accordance with an aspect of the present invention.

Next, referring to FIG. 7, a welding diagnostics system 700 in accordance with an aspect of the present invention is illustrated. The welding diagnostic system 700 includes a welder 610 having a network interface 622, a sensor component 612, a control component 614, a diagnostic component 616, a communications component 618 and a welder data store 624. The welder 610 can further include an event log 626.

The welder 610 and a remote system 640 are operatively coupled via a network 680. The welding diagnostics system 700 further includes monitoring equipment 720 and/or test equipment 730 that are operatively coupled to the remote system 640 and/or the welder 610 via the network 680.

The sensor component 612 is adapted to receive information associated with operation of the welder 610 (e.g., voltage and/or current levels) and/or characteristic(s) of weld(s) produced by the welder 610 (e.g., image(s) of weld(s)). The sensor component 612 can receive information from monitoring equipment 720 (e.g., digital camera and/or streaming video camera image(s) of weld(s)) and/or test equipment 730 (e.g., ohm meter, voltage meter and/or current meter) via the network 680.

The control component 614 is adapted to receive information from the sensor component 612 and to perform test sequence(s) to facilitate diagnostics of the welder 610 based, at least in part, upon information received from the sensor component 612.

The diagnostic component 616 is adapted to receive information from the sensor component 612 and/or the control component 614. The diagnostic component 614 can further receive diagnostic information associated with component(s) and/or system(s) internal to the welder 610 (e.g., printed circuit board(s)). The diagnostic component 616 can perform resident diagnostic mode(s) with regard to the component(s) and/or system(s) internal to the welder 610. Based, at least in part, upon information received from the sensor component 612, the control component 614 and/or internal diagnostics, the diagnostic component 616 determines health status of the welder 610. The health status of the welder can include, but is not limited to, information associated with functional and/or performance test results of the welder, error(s) and/or alarm(s). The diagnostic component 616 can send information associated with the health status of the welder 610 to the remote system 640 via the network interface 622. Further, the diagnostic component 616 can initiate corrective action based, at least in part upon information, received from the sensor component 612, the control component 614, internal diagnostics or from the remote system 640.

The welder 610 can further include a communications component 618 facilitating communications between the welder 610 and the remote system 640. The communications component 618 can receive information associated with the health status of the welder (e.g., an alarm condition) and format the information for use by the remote system 640

(e.g., HTML document). Thus, the communications component 618 can dynamically provide information regarding the health status of the welder to the remote system 640 in a plurality of format(s) within the scope of the present invention (e.g., via dynamic HTML, RTF and/or ASCII text).

The remote system 640 can have an expert component 642 and a web interface component 644. The expert component 642 can employ various artificial intelligence technique(s) (e.g., Bayesian model, probability tree network, fuzzy logic and/or neural network) to facilitate welding diagnostics based, at least in part, upon the health status received from the welder 610. The expert component 642 can adaptively modify its modeling technique(s) based upon historical success (e.g., learn from success of previous welding diagnostics). The web interface component 644 can operatively connect the remote system 640 to remote welding resource(s) (e.g., via the Internet) and/or the welder 610.

The welding diagnostics system 600 can further include a remote expert data store 650 and/or a remote service support data store 660. The remote expert data store 650 can store information associated with welding diagnostics (e.g., current expert system rules, diagrams, welder troubleshooting procedure(s) and/or welder software upgrade(s)) that the expert component 642 can access via the network 680 to facilitate welding diagnostics. The remote service support data store 660 can store information (e.g., welder service record, welder part order information, welder warranty information and/or welder service information) that the expert component 642 can access via the network 680 to facilitate welding diagnostics.

Figure 8:
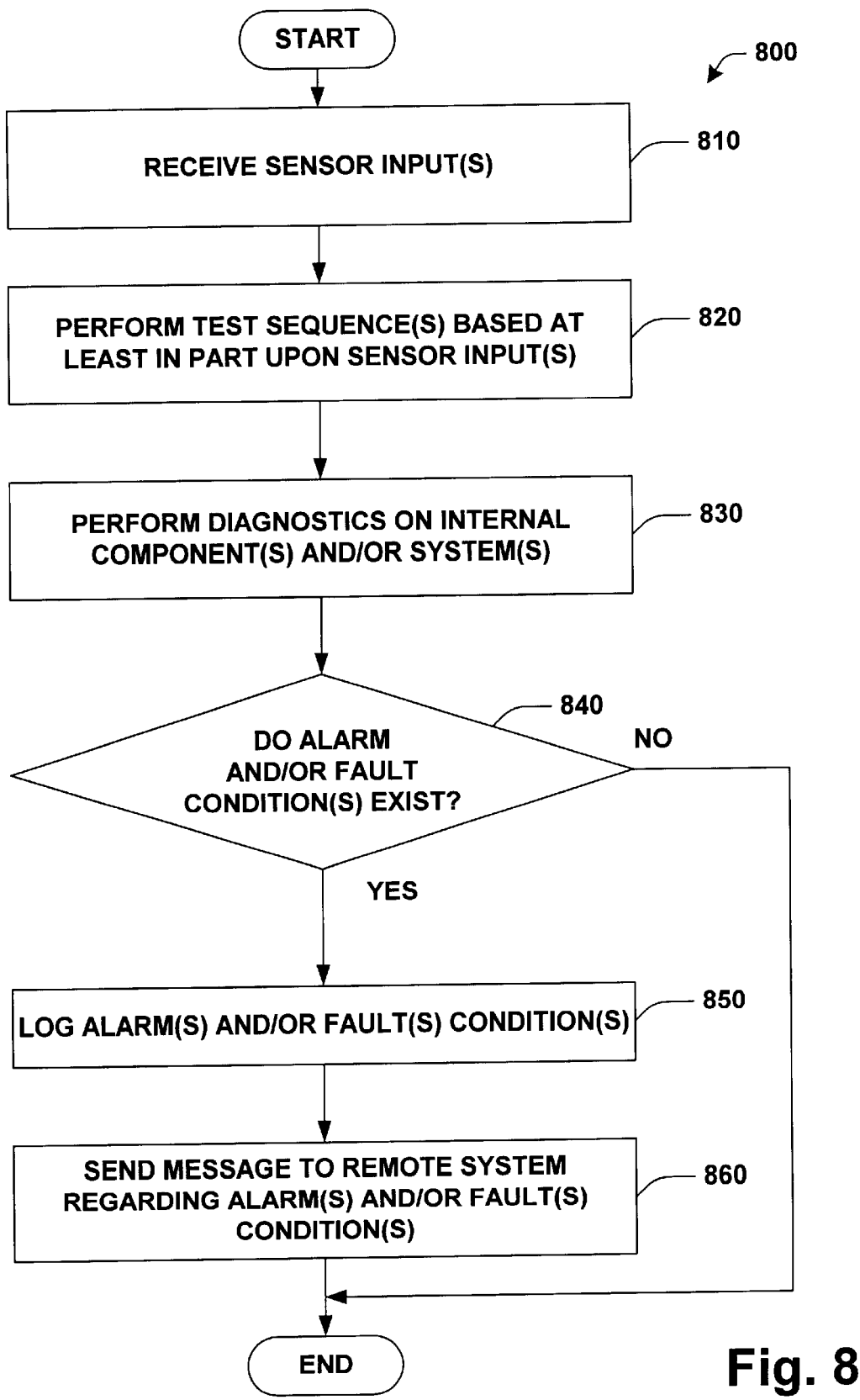
FIG. 8 is a flow diagram illustrating a methodology for providing welding diagnostics in accordance with an aspect of the present invention.
Figure 9:
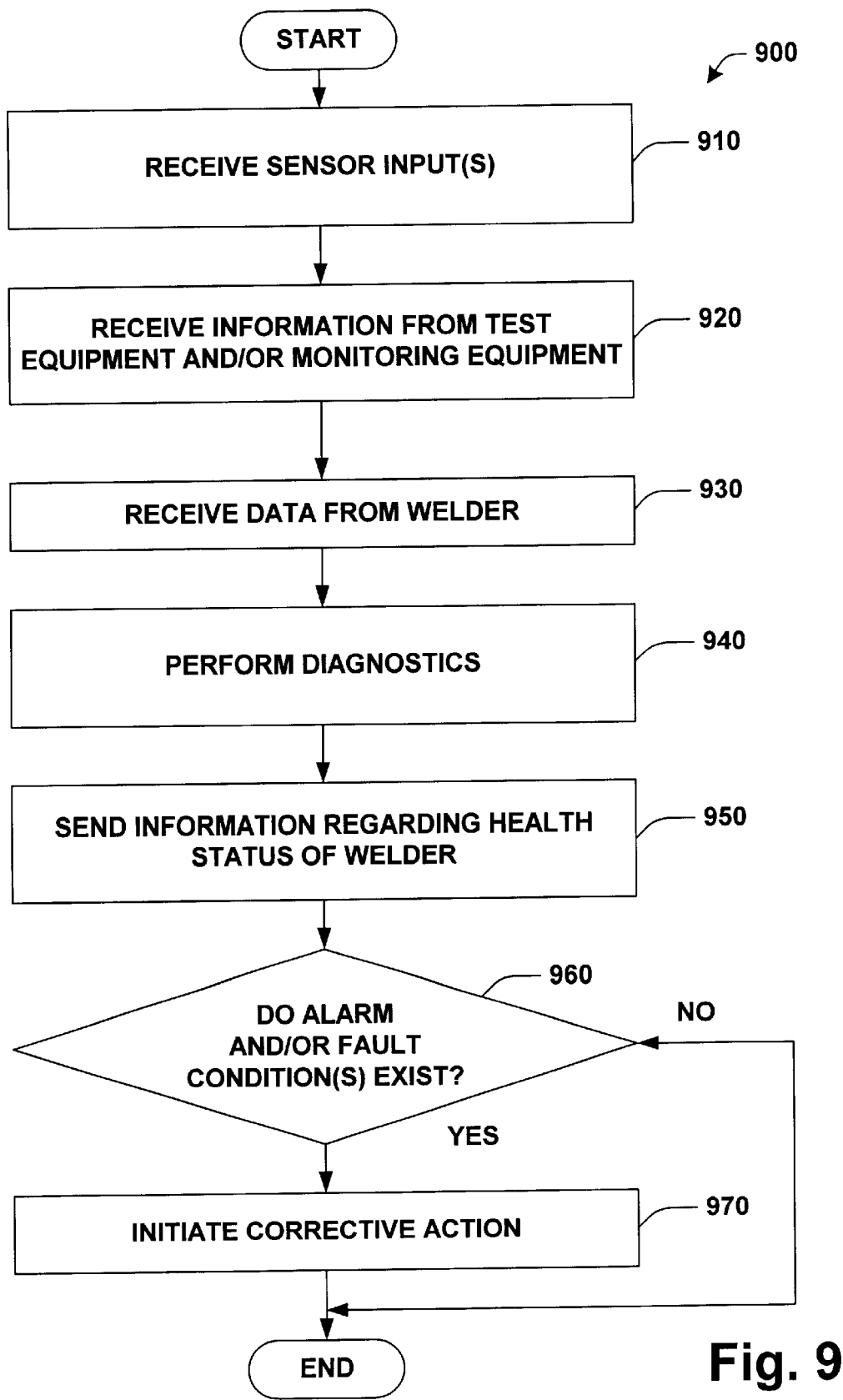
FIG. 9 is a flow diagram illustrating a methodology for providing welding diagnostics in accordance with an aspect of the present invention.

FIGS. 8 and 9 illustrate methodologies for providing various aspects of a welding diagnostics system in accordance with the present invention. The methods comprise a group of actions or processes represented by blocks. While, for purposes of simplicity of explanation, the methodologies are shown and described as a series of blocks, it is to be understood and appreciated that the present invention is not limited by the number or order of blocks, as some blocks may, in accordance with the present invention, occur in different orders and/or concurrently with other blocks from that shown and described herein. For example, those skilled in the art will understand and appreciate that a methodology could alternatively be represented as a series of interrelated states, such as in a state diagram. Moreover, not all illustrated acts may be required to implement a methodology in accordance with the present invention.

Turning to FIG. 8, a methodology 800 for welding system diagnostics is illustrated. At 810, sensor input(s) are received. At 820, test sequence(s) are performed, based at least in part upon the sensor input(s). At 830, diagnostics are performed on internal component(s) and/or system(s). At 840, a determination is made as to whether any alarm and/or fault condition(s) exist. If the determination at 840 is NO, no further processing occurs. If the determination at 840 is YES, at 850, the alarm and/or fault event(s) are logged (e.g., to an event log). At 860, a message is sent to a remote system regarding the alarm and/or fault condition(s) (e.g., via voicemail, telephone, e-mail and/or beeper).

Next, referring to FIG. 9, a methodology 900 for welding system diagnostics is illustrated. At 910, sensor input(s) are received. At 920, information is received from test equipment and/or monitoring equipment. At 930, information is received from the welder. At 940, diagnostics are performed based at least in part upon the sensor input(s), information received from test equipment and/or monitoring equipment and information received from the welder. At 950, information is sent regarding health status of the welder (e.g., to a local system and/or remote system). Next, at 960, a determination is made as to whether an alarm and/or fault condition exists. If the determination at 960 is NO, no further processing occurs. If the determination at 960 is YES, at 970, corrective action is initiated.

What has been described above are various aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A welding system, comprising:
   a sensor component adapted to receive information associated with at least one of operation of a welder and weld characteristics from at least one of test equipment and monitoring equipment, the monitoring equipment being at least one of a digital camera and a streaming video camera;
   a control component adapted to receive information from the sensor component and to perform at least one test sequence to facilitate welder diagnostics based at least in part upon information received from the sensor component;
   a diagnostic component adapted to perform welder internal diagnostics and to receive information from at least one of the sensor component and the control component, the diagnostic component determining a health status of the welder based at least in part upon information received from at least one of the sensor component, the control component and the welder internal diagnostics, the diagnostic component sending information associated with the health status of the welder to a remote system.

2. The welding system of claim 1, further comprising a communications component facilitating communications between the welder and the remote system via at least one of Dynamic HTML, HTML, SHTML, VB Script, JAVA, CGI Script, JAVA Script, dynamic HTML, PPP, RPC, TELNET, TCP/IP, FTP, ASP, XML, PDF, EDT and WML formats.

3. The system of claim 2, the communications component dynamically creating at least one HTML page associated with the health status of the welder.

4. The welding system of claim 1, the control component further adapted to send information to the at least one of test equipment and monitoring equipment to facilitate welder diagnostics.

5. The welding system of claim 1, the test equipment being at least one of an ohm meter, a voltage meter and a current meter.

6. The welding system of claim 1, further comprising a web pages database storing links to welding diagnostic resources.

7. The welding system of claim 1, further comprising a welder data store storing at least one of welder serial number, welder model number, welder build date, welder software version identifier, component part identifier, component version identifier and component software version identifier.

8. The welding system of claim 1, the welder and the remote system operatively coupled via at least one of a local network, an extranet and the Internet.

9. The welding system of claim 1, the welder further comprising at least one of a web server, an WEEP server and an SMTP server.

10. The welding system of claim 1, the welder sending a message associated with the health stains of the welder to the remote system via at least one of voicemail, e-mail, telephone, and beeper.

11. The welding system of claim 10, further comprising an event component facilitating reporting of an alarm condition, the message further comprising information associated with the alarm condition.

12. The welding system of claim 11, the event component further storing information associated with the alarm condition in an event log.

13. The welding system of claim 10, further comprising a communications data store storing information associated with communicating the message, the communications data store having at least one of telephone number, e-mail address and beeper number.

14. The welding system of claim 1, the welder sending a request to schedule maintenance to the remote system via at least one of voicemail, e-mail, telephone and beeper.

15. A system for facilitating welding system diagnostics, comprising:
  a welder having a network interface to facilitate communication between the welder and a local system, the network interface comprising at least one of a web server, an HTTP server and an SMTP server;
  a sensor component adapted to receive information associated with at least one of operation of the welder and weld characteristics;
  a control component adapted to receive information from the sensor component and to perform at least one test sequence to facilitate welder diagnostics based at least in part upon information received from the sensor component; and,
  a diagnostic component adapted to perform welder internal diagnostics and to receive information from at least one of the sensor component and the control component, the diagnostic component determining a health status of the welder based at least in part upon information received from at least one of the sensor component, the control component and the welder internal diagnostics, the diagnostic component sending information associated with the health status of the welder to the local system via the network interface,
  wherein the local system has an expert component, the expert component receiving information associated with the health status of the welder and facilitating welding diagnostics.

16. The system of claim 15, the welder further comprising a communications component facilitating communications between the welder and the local system via at least one of Dynamic HTML, HTML, SMTML, VB Script, JAVA, CGI Script, JAVA Script, dynamic HTML, PPP, RPC, TELNET, TCP/IP, FTP, ASP, XML, PDF, EDI and WML formats via the network interface.

17. The system of claim 16, the communications component dynamically creating at least one HTML page associated with the health status of the welder.

18. The welding system of claim 15, at least one of the sensor component and the local system further adapted to receive information associated with the at least one of operation of the welder and weld characteristics from at least one of test equipment and monitoring equipment.

19. The welding system of claim 15, the welder and the local system operatively coupled via at least one of a local network, an extranet and the Internet.

20. The system of claim 15, the expert component further adapted to facilitate welding diagnostics using at least one of a Bayesian model, a probability tree network, a fuzzy logic model and a neural network.

21. The system of claim 15, the local system further comprising a local service support data store storing information with welders comprising at least one of welder service record, welder pan order information, welder warranty information and welder service information, the expert component utilizing information stored in the local service support data store to facilitate welding diagnostics.

22. The system of claim 15, the local system further comprising expert data store storing information associated with welding diagnostics comprising at least one of expert system rules, diagrams, welder troubleshooting procedures and welder software, the expert component utilizing information stored in the expert data store to facilitate welding diagnostics.

23. The system of claim 15, the local system further operatively coupled via a second network to at least one of a remote service data store and a remote expert data store, the expert component utilizing information stored in the at least one of remote service data store and remote expert data store to facilitate welding diagnostics.

24. A system for facilitating welding system diagnostics, comprising:
  a welder having it network interface to facilitate communication between the welder and a remote system;
  a sensor component adapted to receive information associated with at least one of operation of the welder and weld characteristics;
  a control component adapted to receive information from the sensor component and to perform at least one test sequence to facilitate welder diagnostics based at least in part upon information received from the sensor component; and,
  a diagnostic component adapted to perform welder internal diagnostics and to receive information from at least one of the sensor component and the control component, the diagnostic component determining a health status of the welder based at least in part upon information received from at least one of the sensor component, the control component and the welder internal diagnostics, the diagnostic component sending information associated with the health status of the welder to the remote system via the network interface,
  wherein the remote system has an expert component, the expert component receiving information associated with the health status of the welder and facilitating welding diagnostics via at least one of a Bayesian model, a probability tree network, a fuzzy logic model and a neural network.

25. The system of claim 24, the welder further comprising a communications component facilitating communications between the welder and the remote system via at least one of Dynamic HTML, HTML, SHTML, VS Script, JAVA, CGI Script, JAVA Script, dynamic HTML, PPP, RPC, TELNET, TCP/IP, FTP, ASP, XML, PDF, EDT and WML formats via the network interface.

26. The system of claim 25, the communications component dynamically creating at least one HTML page associated with the health status of the welder.

27. The welding system of claim 24, at least one of the sensor component and the local system further adapted to receive information associated with the at least one of operation of the welder and weld characteristics from at least one of test equipment and monitoring equipment.

28. The welding system of claim 24, the welder and the remote system operatively coupled via at least one of a local network, an extranet and the Internet.

29. The system of claim 24, further comprising a remote service support data store storing information associated with welders comprising at least one of welder service record, welder part order information, welder warranty information and welder service information, the remote system operatively coupled to the remote system, the expert component utilizing information stored in the remote service support data store to facilitate welding diagnostics.

30. The system of claim 24, further comprising a remote expert data store storing information associated with welding diagnostics comprising at least one of expert system rules, diagrams, welder troubleshooting procedures and welder software, the remote expert data store operatively coupled to the remote system, the expert component utilizing information stored in the expert data store to facilitate welding diagnostics.

31. The system of claim 24, further comprising at least one of test equipment and monitoring equipment operatively coupled to at least one of the welder and the remote system.

* * * * *